Jan. 1, 1935. J. C. McCUNE 1,986,481
LUBRICATING DEVICE FOR COMPRESSORS
Filed July 25, 1930
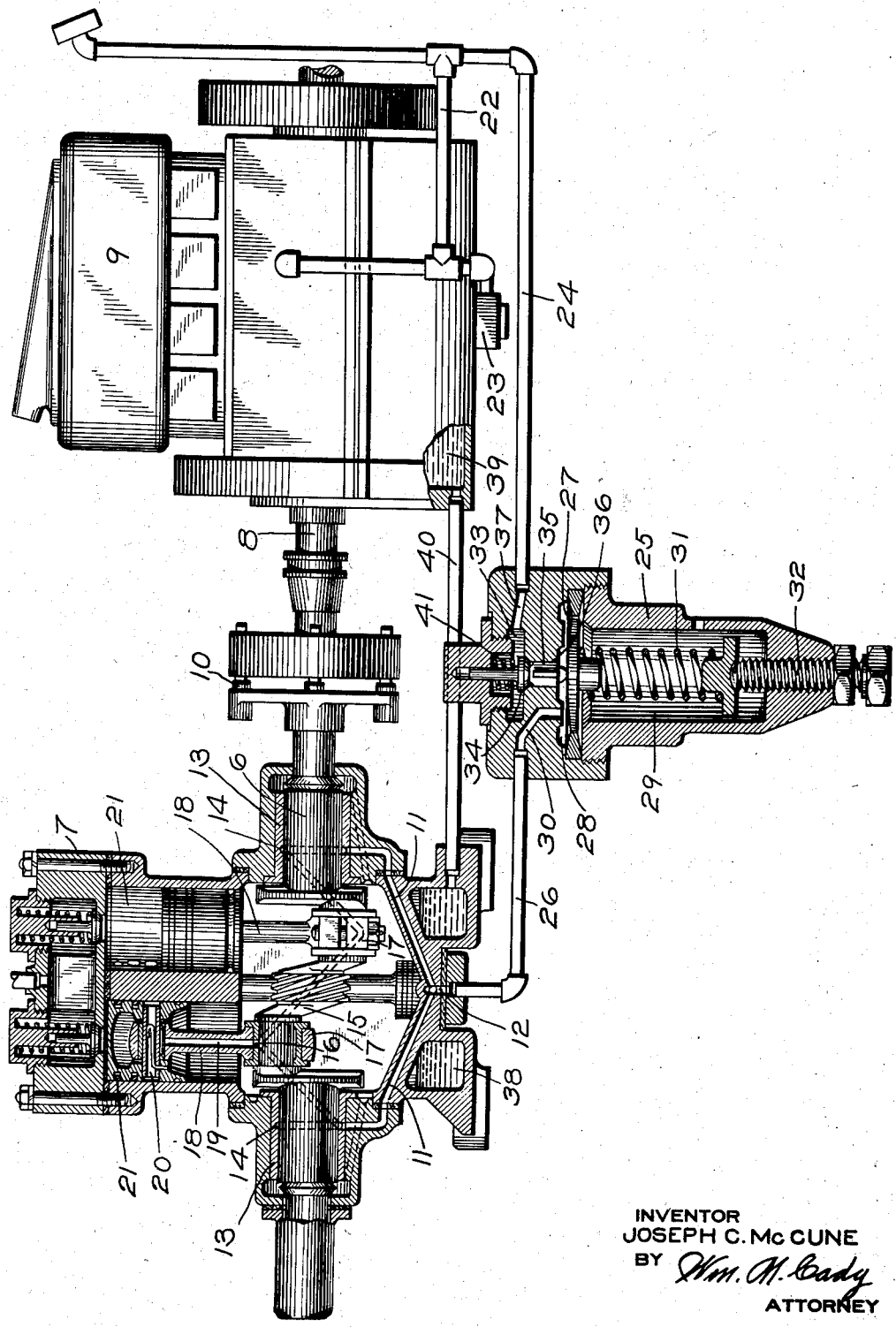
INVENTOR
JOSEPH C. McCUNE
BY *Wm. M. Cady*
ATTORNEY Patented Jan. 1, 1935

1,986,481

UNITED STATES PATENT OFFICE 1,986,481

LUBRICATING DEVICE FOR COMPRESSORS

Joseph C. McCune, Edgewood, Pa., assignor to The Westinghouse Air Brake Company, Wilmerding, Pa., a corporation of Pennsylvania Application July 25, 1930, Serial No. 470,605

11 Claims. (Cl. 184—6)

This invention relates to engines and more particularly to means for lubricating fluid compressors.

An object of the invention is to provide means for lubricating a fluid compressor driven from an internal combustion engine in which the lubricant is supplied to the compressor from the internal combustion engine.

Another object of the invention is to provide a lubricating system of the above type in which means are provided for regulating the pressure of the lubricant supplied to the compressor.

Another object of the invention is to provide an improved lubricating system of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic view, partly in section, of a lubricating system for a fluid compressor embodying the invention.

Referring to the drawing, the crankshaft 6 of an air compressor 7 is connected to the crankshaft 8 of an internal combustion engine 9 by a suitable coupling 10, so that the compressor will be driven by the engine when the latter is operating.

For the purpose of supplying lubricant in the form of engine oil, such as that usually employed for lubricating internal combustion engines, to the working parts of the air compressor 7, the base of the compressor is provided with passages or oil ducts 11 which lead from a single passage 12 to the two main crankshaft bearings 13. Each bearing 13 is grooved as at 14 and connecting the grooves is a passage 15 which is drilled through the crankshaft 6 in such a way as to intersect the grooves 16 in the bearings 17 of the connecting rods 18. Each connecting rod is in turn drilled lengthwise so as to provide a passage or oil duct 19 which leads to the hollow wrist pin 20 of each piston 21.

The air compressor 7 is adapted to be supplied with lubricant from the lubricating system of the internal combustion engine 9, and in the present instance an oil pipe 22, leading from the engine oil pump 23, is connected to the passage 12 of the air compressor, by pipe 24, oil pressure regulating valve device 25, and pipe 26.

The valve device 25 may comprise a diaphragm 27 which is mounted in the casing between chambers 28 and 29, the chamber 28 being connected to the pipe 26 by a passage 30, and chamber 29 being open to the atmosphere.

On one side the diaphragm 27 is subject to the pressure of a coil spring 31 contained in chamber 29. The pressure of the spring 31 is regulated by an adjusting screw 32 threaded in the casing.

Mounted in a chamber 33 formed in the casing of the valve device 25, is a tappet valve 34 having a fluted stem 35 which projects through an opening 36 formed in the casing between chambers 28 and 33. The stem 35 terminates adjacent to the diaphragm 27. Chamber 33 is connected to pipe 24 by a passage 37.

In operation, when the internal combustion engine 9 is not operating, the spring 31, acting on the diaphragm 27, flexes said diaphragm upwardly so that the valve 34 is unseated.

When the internal combustion engine 9 is started up, the oil pump 23 forces the oil through pipes 22 and 24, and passage 37, to chamber 33, of the valve device 25, past the unseated valve 34, to diaphragm chamber 28, and from thence through passage 30, and pipe 26 to the passage 12. The oil is then directed by the passages 11, 15 and 19 to the various working parts of the air compressor. The surplus oil collects in the chamber 38 in the bottom of the compressor and flows back to the oil reservoir chamber 39 of the internal combustion engine 9 through pipe 40.

When the pressure of the oil thus supplied to the diaphragm chamber 28 from the internal combustion engine becomes sufficient to overbalance the opposing pressure of spring 31 on diaphragm 27, said diaphragm is deflected downwardly, permitting spring 41 to seat the valve 34 and prevent further increase in pressure of the oil delivered to the air compressor 7. In this way the lubricating oil will be supplied to the air compressor from the internal combustion engine 9 at the desired reduced pressure below the pressure of the oil supplied to the working parts of the engine.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a machine having a plurality of passages adapted to be supplied with a liquid lubricant under pressure, of an engine for operating said machine, said engine having a pressure lubricating system, and means controlled by the pressure of lubricant supplied to the machine for supplying the lubricant from said engine to the passages of said machine at reduced pressure.

2. The combination with a machine having a plurality of passages adapted to be supplied with liquid lubricant under pressure, of an engine for operating said machine, said engine having a pressure lubricating system, means for supplying the lubricant from said engine to the passages of said machine, and means controlled by the pressure of the lubricant supplied to the machine for so regulating the pressure of the lubricant supplied to said machine, that a predetermined lubricant pressure is maintained in the passages of said machine.

3. The combination with a machine having a plurality of passages adapted to be supplied with lubricant under pressure, of an engine for operating said machine, said engine having a pressure lubricating system, means for supplying the lubricant from said engine to the passages of said machine, pressure sensitive means controlled by the pressure of the lubricant supplied to the machine for so regulating the pressure of the lubricant supplied to said machine that a predetermined lubricant pressure is maintained in the passages of said machine, and means for returning the lubricant from the machine to the engine.

4. The combination with a motor, a machine and a lubricating system including a pump driven by the motor for forcing the lubricant through the system to parts of the motor and the machine, of a pressure regulating device in the system controlled by the pressure of lubricant supplied to the machine for regulating the pressure of the lubricant supplied by the pump to the machine to a substantially constant value differing from the pressure of the lubricant supplied by the pump to said motor.

5. The combination with a motor, a machine driven by the motor and a lubricating system including a pump driven by the motor for forcing the lubricant through the system to parts of the motor and the machine, of a pressure regulating device in the system controlled by the pressure of lubricant supplied to the machine for regulating the pressure of the lubricant supplied by the pump to the machine to a substantially constant value differing from the pressure of the lubricant supplied by the pump to said motor.

6. The combination with a motor, a machine driven by the motor and a lubricant circulating system including a pump driven by the motor for forcing the lubricant through the system to parts of the motor and the machine, of a pressure regulating device in the system controlled by the pressure of the lubricant supplied to the machine for regulating the pressure of the lubricant supplied by the pump to the machine to a substantially constant value differing from the pressure of the lubricant supplied by the pump to said motor.

7. The combination with a motor, a machine and a lubricating system including a pump driven by the motor for forcing the lubricant through the system to parts of the motor and the machine, of a pressure regulating device in the system controlled by the pressure of the lubricant supplied to the machine for limiting the pressure of the lubricant supplied by the pump to the machine to a predetermined pressure that is less than that of the lubricant supplied by the pump to the motor.

8. The combination with a motor, a machine and a lubricating system including a pump driven by the motor for forcing the lubricant through the system to parts of the motor and the machine, of a fluid pressure responsive pressure regulating device in the system and subject to fluid lubricant supplied to the machine and controlled by the pressure of the lubricant supplied to the machine for regulating the pressure of the lubricant supplied by the pump to the machine to a substantially constant predetermined value differing from the pressure of the lubricant supplied by said pump to said motor.

9. The combination with a motor, a machine driven by the motor and a lubricating system including a pump driven by the motor for forcing the lubricant through the system to parts of the motor and the machine, of a fluid pressure responsive pressure regulating device in the system and subject to fluid lubricant supplied to the machine by said pump and controlled by the pressure of the lubricant supplied to the machine for regulating the pressure of the lubricant supplied by the pump to the machine to a substantially constant predetermined value differing from the pressure of the lubricant supplied by said pump to said motor.

10. The combination with a motor, a machine and a lubricating system including a pump driven by the motor for forcing lubricant through the system to parts of the motor and the machine, of a pressure responsive pressure regulating device in the system subject to fluid lubricant supplied to the machine by said pump and controlled by the pressure of the lubricant supplied to the machine for limiting the pressure of the lubricant supplied by the pump to the machine to a predetermined pressure that is less than that of the lubricant supplied by the pump to the motor.

11. The combination with a motor, a machine and a lubricating system including a pump driven by the motor for forcing the lubricant through the system to parts of the motor and the machine, of a fluid pressure responsive pressure reducing device in the system controlled by the pressure of the fluid lubricant supplied to the machine for automatically maintaining the pressure of the lubricant supplied by the pump to the machine at a substantially constant value regardless of variations in the pressure of the fluid supplied by the pump above said constant value.

JOSEPH C. McCUNE.